United States Patent [19]

Slyman

[11] 3,917,857
[45] Nov. 4, 1975

[54] DEHYDRATED READY MIX TABOULY SALAD
[75] Inventor: Edmond Abdo Slyman, Bristow, Okla.
[73] Assignee: Slymans Lebanese Foods, Mfg. Co., Inc., Bristow, Okla.
[22] Filed: Sept. 19, 1973
[21] Appl. No.: 398,675

Related U.S. Application Data
[63] Continuation of Ser. No. 188,528, Oct. 12, 1971, abandoned.

[52] U.S. Cl. .................................. 426/106; 426/618
[51] Int. Cl.² .......................................... A23L 1/212
[58] Field of Search ............................ 426/208, 106

[56] References Cited
OTHER PUBLICATIONS
Foods of the World "Middle Eastern Cooking" Time Life Book, New York, 1969, p. 6.
Bennett, Substitutes, Chem. Pub. Co. Inc., Brooklyn, N.Y., 1943, p. 93.

Primary Examiner—Jeanette M. Hunter
Attorney, Agent, or Firm—Wood, Herron & Evans

[57] ABSTRACT
Disclosed herein is a dehydrated Tabouly salad mix to which is added water, oil, and fresh chopped tomatoes.

6 Claims, No Drawings

DEHYDRATED READY MIX TABOULY SALAD

This is a continuation of application Ser. No. 188,528, filed Oct. 12, 1971, now abandoned.

BACKGROUND OF THE INVENTION

There are available to housewives today many prepared food items which can be served almost immediately upon opening. The frozen food departments in supermarkets contain items ranging from frozen chili to frozen veal parmesan. Other methods have also been utilized to prepare and preserve food in such a manner that a housewife can serve a delicious meal without having to spend hours in the process.

Unfortunately though there are foods that a housewife still must prepare entirely herself if she wishes to capture and preserve all of the savory qualities of the dish. One such food that has heretofore required preparation by the housewife is Tabouly salad. This salad is a Lebanese salad which contains ingredients that were heretofore thought to be impossible to combine and store for later use.

It has, therefore, been a principal objective of this invention to provide a prepackaged Tabouly salad mix which may be stored for long periods of time and which may, by the addition of only a few other ingredients, and through the expenditure of only a minor amount of time, be prepared into a final salad. It has been an added objective to provide such a mix which after preparation provides the taste of a Tabouly salad that has been prepared from the basic materials by the housewife.

PRIOR ART

Tabouly salads are old in the art. One such salad is disclosed in "The Cookbook of the United Nations," compiled and edited by Barbara Kraus, and published by Simon and Schuster of New York, N.Y. and consists of the following:

½ cup bulgur (cracked wheat), finely crushed
Water
1 ½ cups finely chopped parsley
½ cup finely chopped fresh mint leaves
1 onion, chopped
1 tomato, chopped
¼ cup lemon juice
¼ cup olive oil
½ teaspoon salt
¼ teaspoon black pepper
Lettuce To prepare the salad the following instructions are given:

Soak bulgur in water to cover for ½ hour. Drain well; add parsley, mint, onion and tomato to drained bulgur. Mix lemon juice, oil, salt and pepper, and add to salad. Toss lightly, coating salad ingredients. Serve on lettuce. Yield: 6 servings.

A prepackaged dehydrated Tabouly salad mix having the following analysis is known.

| Ingredient | Wt. Oz. |
| --- | --- |
| Cracked Wheat No. 2 grade | 5 ½ |
| Onions | |
| Parsley | about 2 |
| Green Peppers | |
| Pepper | |
| Salt | about ¼ |
| Mint | |
| Lemon globules | |

While the mix was very palatable when used in a Tabouly salad it still failed to satisfy the long felt needs in this area for such a product.

SUMMARY OF THE INVENTION

I have now found that a dehydrated Tabouly salad mix consisting essentially of the following percentages, on a weight basis, satisfies the foregoing objectives, 2.4 to 4.4% citric acid, 3.6 to 6.6% salt, 0.5 to 0.9% black pepper, 0.16 to 0.20% mint, 0.6 to 1.0% red pepper, 0.6 to 1.0% green pepper, 10.6 to 13% onion, 2.3 to 5.3% parsley, and 73 to 76% wheat. For use about ⅓ cup of salad oil and two cups water are added to about 225 grams of the mix. To this is added three or four fresh chopped tomatoes. After refrigeration for at least two hours the salad is ready to be eaten. If desired it may be added to lettuce.

While the differences between the Tabouly salad mix of the present invention and that of the prior art appear at first glance to be very minor, they are in fact very substantial and provide a Tabouly salad mix which is materially different in taste as well as in time of preparation.

One of the main differences between the present invention and that of the prior art is that the present invention includes citric acid and does not contain any lemon globules. The lemon globules heretofore employed contained a minor amount of citric acid, corn syrup, dehydrated lemon juice and natural lemon flavoring. The lemon flavor and lemon juice contained as a principal flavor component limeonene. In contrast, citric acid does not have this flavor material and does not impart it to the salad. The acid is used only to provide a sour or tart taste.

The prior use of lemon globules was found to mask the flavor of the mint to a large extent and the salad mix after preparation had to stand for a long period of time in order for the mint flavor to be detectable. The elimination of the lemon globules and the flavor it contributed and the inclusion of citric acid permits the mix to be used in a much shorter period of time after mixing. Of course, the shorter preparation time is very desirable in a product of this type.

In addition to the major difference just discussed it will also be noted that the mixture of the present invention includes an amount of red pepper which was not present in the prior art Tabouly salad mix. The inclusion of the red pepper substantially alters the taste of the final product.

DESCRIPTION OF THE PREFERRED EMBODIMENTS

The preferred formulation for the Tabouly salad mix of the present invention consists essentially of on a weight basis about 76% No. 2 grade cracked wheat, about 3.3% dehydrated parsley, about 11.8% dehydrated onions, about 0.7% red pepper, about 0.7% green pepper, about 0.18% mint, about 0.6% black pepper, about 4.6% salt, and about 2.4% citric acid.

The citric acid employed may be either the monohydrate ($C_6H_8O_7 \cdot H_2O$) or the anhydrous acid form ($C_6H_8O_7$). Also, instead of the acid, the sodium salt of the acid may be used. Therefore, when citric acid is used herein, it is meant to include these various forms as well as all other equivalent forms.

The salt utilized is ordinary table salt. The black, red and green pepper and mint employed are also staple articles of commerce. They may be prepared in the customary manner as for example by dehydration or freeze drying.

In order to prepare a salad mix from the above components the following procedure has been utilized. About 225 grams of a Tabouly salad mix having the foregoing formulation is mixed with two cups of water and one-third cup of oil. To this mixture is added three or four freshly chopped tomatoes. The mixture is then stirred thoroughly and permitted to stand for several hours, or preferably over night, in a refrigerator. The mixture will be thin at first but after standing in the refrigerator it will thicken. The resultant mixture will serve approximately six to nine people. The final product may be eaten in this form or it may be added to a lettuce salad.

Having thus described my invention, I claim:

1. A Tabouly salad mix in dehydrated form consisting essentially of, on a weight basis, about
   2.4 to 4.4% citric acid,
   3.6 to 6.6% salt,
   0.5 to 0.9% black pepper,
   0.16 to 0.20% mint,
   0.6 to 1% red pepper,
   0.6 to 1% green pepper,
   10.6 to 13% onion,
   2.3 to 5.3% parsley, and
   73 to 76% cracked wheat,
   said mix adapted to be mixed with water and oil to form a Tabouly salad which is ready to be consumed no later than about two hours after said mixing.

2. The mix of claim 1 wherein said salad mix consists essentially of about 76% No. 2 grade cracked wheat, about 3.3% dehydrated parsley, about 11.8% dehydrated onions, about 0.7% red pepper, about 0.7% green pepper, about 0.18% mint, about 0.6% black pepper, about 4.6% salt, and about 2.4% citric acid.

3. The mix of claim 1 wherein said mix is packaged as a dehydrated mixture.

4. The mix of claim 2 wherein said mix is packaged as a dehydrated mixture.

5. The method of making a Tabouly salad from the mix of claim 1 comprising
   mixing about 225 grams of said mix with about two cups of water and one-third cup of oil,
   adding to said mixture about 3 to 4 chopped tomatoes, and
   refrigerating said mixture for at least two hours.

6. The method of making a Tabouly salad from the mix of claim 2 comprising,
   mixing about 225 grams of said mix with about two cups of water and about one-third cup of oil,
   adding to said mixture about 3 to 4 chopped tomatoes, and
   refrigerating said mixture for at least two hours.

* * * * *